United States Patent
Miyachi et al.

(10) Patent No.: US 7,653,658 B2
(45) Date of Patent: Jan. 26, 2010

(54) DATA FILE STORAGE/MANAGEMENT APPARATUS AND ELECTRONIC MAIL PROCESSING PROGRAM THEREOF

(75) Inventors: Hiroki Miyachi, Kanagawa-ken (JP); Harunobu Maeda, Shizuoka-ken (JP); Yoshiko Suenaga, Kanagawa-ken (JP); Kouichi Mase, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 327 days.

(21) Appl. No.: 11/233,244

(22) Filed: Sep. 21, 2005

(65) Prior Publication Data

US 2006/0080366 A1    Apr. 13, 2006

(30) Foreign Application Priority Data

Sep. 28, 2004    (JP)    .............................. 2004-282120

(51) Int. Cl.
    *G06F 17/00*    (2006.01)
(52) U.S. Cl. .................... 707/104.1; 707/101; 707/102; 707/103 R; 707/201; 707/205; 709/206
(58) Field of Classification Search .............. 707/1–10, 707/100–104.1, 200–206; 709/204–207
    See application file for complete search history.

(56) References Cited

U.S. PATENT DOCUMENTS

| 6,230,156 B1 * | 5/2001 | Hussey ........................ 707/10 |
| 6,985,949 B2 * | 1/2006 | Inamori et al. .............. 709/225 |
| 2001/0005837 A1 * | 6/2001 | Kojo ........................... 705/51 |
| 2002/0051183 A1 * | 5/2002 | Tsukui et al. .............. 358/1.15 |
| 2004/0093385 A1 * | 5/2004 | Yamagata ................... 709/206 |

FOREIGN PATENT DOCUMENTS

JP    2003-058542    2/2003

* cited by examiner

*Primary Examiner*—Isaac M Woo
(74) *Attorney, Agent, or Firm*—SoCal IP Law Group LLP; Steven C. Sereboff; John E. Gunther

(57) ABSTRACT

A data file storage/management apparatus, having file storage means, stores and manages one or more data files, and the data file storage/management apparatus installs an electronic mail processing program therein, thereby operating as follows. Thus, the data file storage/management apparatus interprets the processing of the data file, which is described in a program-like manner, at least within the main sentence thereof, when receiving the electronic mail, and starts the processing of the data file designated or instructed; thereby enabling to instruct, easily, the processing on the data files, being various for users thereof, to the data file storage/management apparatus.

13 Claims, 4 Drawing Sheets

FIG.4

SUBJECT MATTER  *MI=ON* 2003 sales data

MAIN SENTENCE  copy attached file1.xls to folder sales  — L1
ocr attached file2.jpg to file2.pdf  — L2
if (file2.pdf include "Marketing")  — L3
copy file2.pdf to folder marketing  — L4
else  — L5
copy file2.pdf to folder sales  — L6
send attached file1.xls to dest_profile1  — L7
send attached file1.xls to printer1 with print_profile1

ATTACHMENT FILE  file1.xls, file2.jpg  — L8

DATA FILE STORAGE/MANAGEMENT APPARATUS AND ELECTRONIC MAIL PROCESSING PROGRAM THEREOF

BACKGROUND OF THE INVENTION

The present invention relates to a data file storage and management apparatus, and an electronic mail processing program thereof. In particular, the invention can be applied to a data file sharing apparatus for enabling common use of the data files, such as electronic documents or the like, for example, sharing among plural numbers of uses.

Conventionally, a document file is also posted or put into a database being shared in common with plural numbers of users, while using an electronic mail attached with a document file(s), by a user, as is described in Japanese Patent Laying-Open No. 2003-58542, in particular, in a column [0002] thereof. And, it is also considered into, to give an instruction of searching and taking out a desired one, to a document managing server, in the form of an electronic mail, thereby to obtain the document corresponding thereto from among of those documents stored in such the database, in the Japanese Patent Laying-Open No. 2003-58542, for example.

However, in the conventional system mentioned above, the items, which can be instructed to the document management server in the form of an electronic mail, are limited only into, such as, a registration of an attachment document file into the database, and/or a search from the database and a transmission of the corresponding document extracted therefrom. Herein, the search condition is made up through a method of describing only a kind of a search element and contents of the element, into a main text portion of the electronic mail, in such a way, a "keyword" is "plan OR report", and/or "producer" is "○□△X", for example.

In case when a user wishes to process or deal with the common document file(s), differently, it can be achieved through setting up the process contents into the document management server, after taking a communication with a system manager side. For example, for achieving storage of a document file mailed from a certain user "A" into a predetermined folder "B", there is only a way of describing such a software application, within the document management server, i.e., that the processing is processed, as mentioned above.

However, with such the method, there are drawbacks that the software comes to be expansive within the document management server when the process is requested differently in the contents, depending on the user, and also that it is also impossible to deal with changes on the contents of such the processes requested, easily.

SUMMARY OF THE INVENTION

An object is, according to the present invention, to provide a data file storage/management apparatus, to which each user or the like of the common database can instruct the data file process desired, easily, at that time-point, and also to provide an electronic mail processing program, being suitable to be installed into such the apparatus, as well.

For accomplishing such the object mentioned above, according to the present invention, firstly there is provided a data file storage/management apparatus, including: file storage means, the data file storage/management apparatus for storing and managing at least one data file therein; mail interpreting means for interpreting an electronic mail, which includes a process on the data file described in a program manner within a portion of a subject matter and/or a main sentence thereof, thereby obtaining the process of the data file instructed; and file processing start-up means for starting up an instructed process of the data file.

Also, according to the present invention, secondly there is provided an electronic mail processing program, being installed into a data file storage and management apparatus, having file storage means, for storing and managing at least one data file therein, including the routines of: a mail interpreting routine, for interpreting an electronic mail, which includes a process on the data file described in a program manner within a portion of a subject matter and/or a main sentence thereof, thereby obtaining the process of the data file instructed; and a file processing startup routine for starting up an instructed process of the data file.

Thus, according to the present invention, the processing of the data file relating to the file storage means of the data file storage/management apparatus can be instructed through a program-like description within at least a main sentence of the electronic mail, and therefore, it is possible for a user to instruct various kinds of processing of the data file to the data file storage and management apparatus, easily.

BRIEF DESCRIPTION OF THE DRAWING

Those and other objects, features and advantages of the present invention will become more readily apparent from the following detailed description when taken in conjunction with the accompanying drawings wherein:

FIG. 4 is an explanatory view for showing an example of description of an electronic mail, in the embodiment.

DESCRIPTION OF THE EMBODIMENTS

(A) Embodiment

Hereinafter, explanation will be given fully, about a data file storage and/or management apparatus and an electronic mail processing program thereof, according to the present invention, by referring to the attached drawings.

(A-1) Structures of the Embodiment

Figure 1:
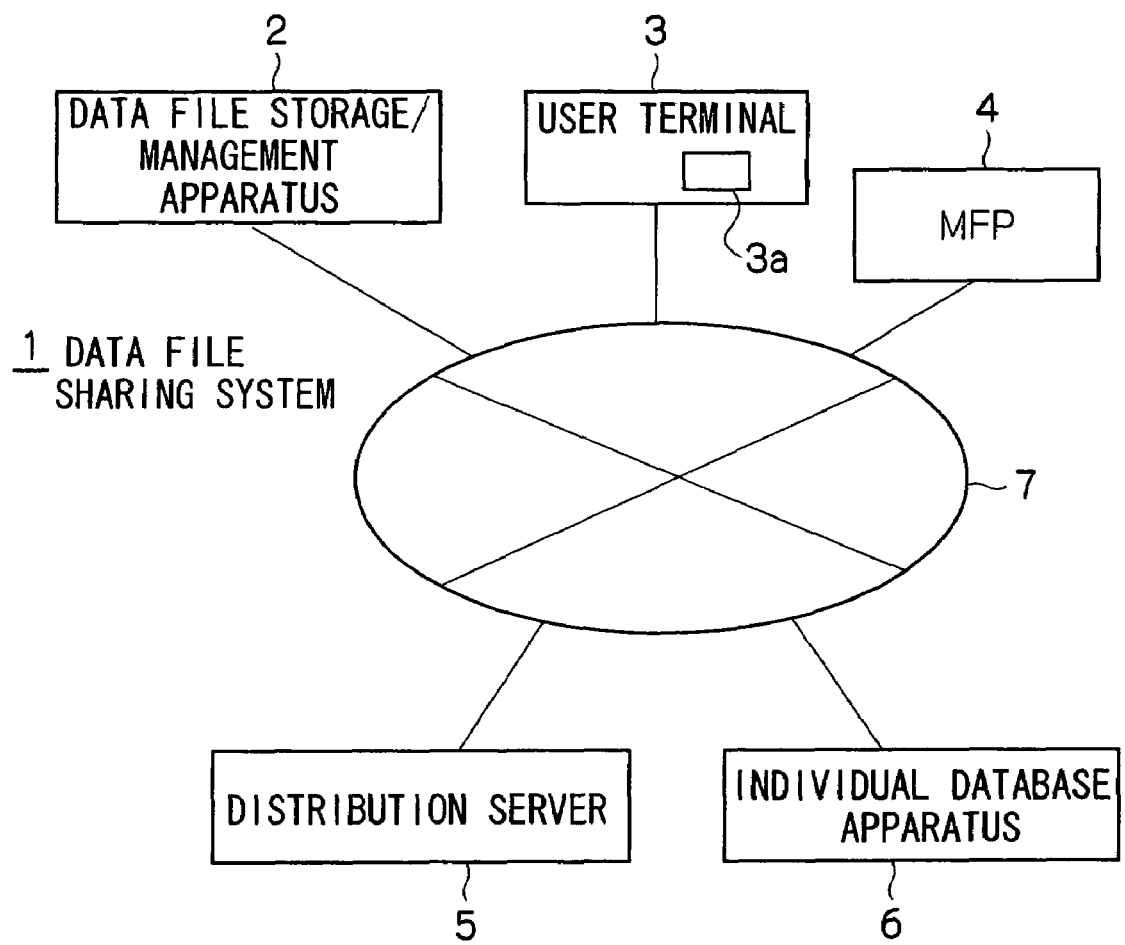
FIG. 1 is a block diagram for showing the structure of a data file sharing system, according to an embodiment of the present invention.

FIG. 1 is a block diagram for showing an outline configuration of the data file sharing system, which includes the data file storage/management apparatus (i.e., a data file sharing apparatus) according to the present embodiment, therein.

The data file sharing system 1 according to the present embodiment comprises, as is shown in FIG. 1, a data file storage/management apparatus 2, a user terminal 3, a MFP (Multi Function Printer) 4, a distribution server 5, an individual database apparatus 6, etc., each being connected with one another through a network 7, in a one (1) piece thereof or more than that. Herein, the network 7 may be a LAN or the like, or it may be a large scaled network.

The data file storage/management apparatus 2 is a server for conducting, for example, registration and storage of the data files, which are shared in common with plural numbers of users, and outputting of the data files, user management, security management, history management, etc., integrally.

Figure 2:
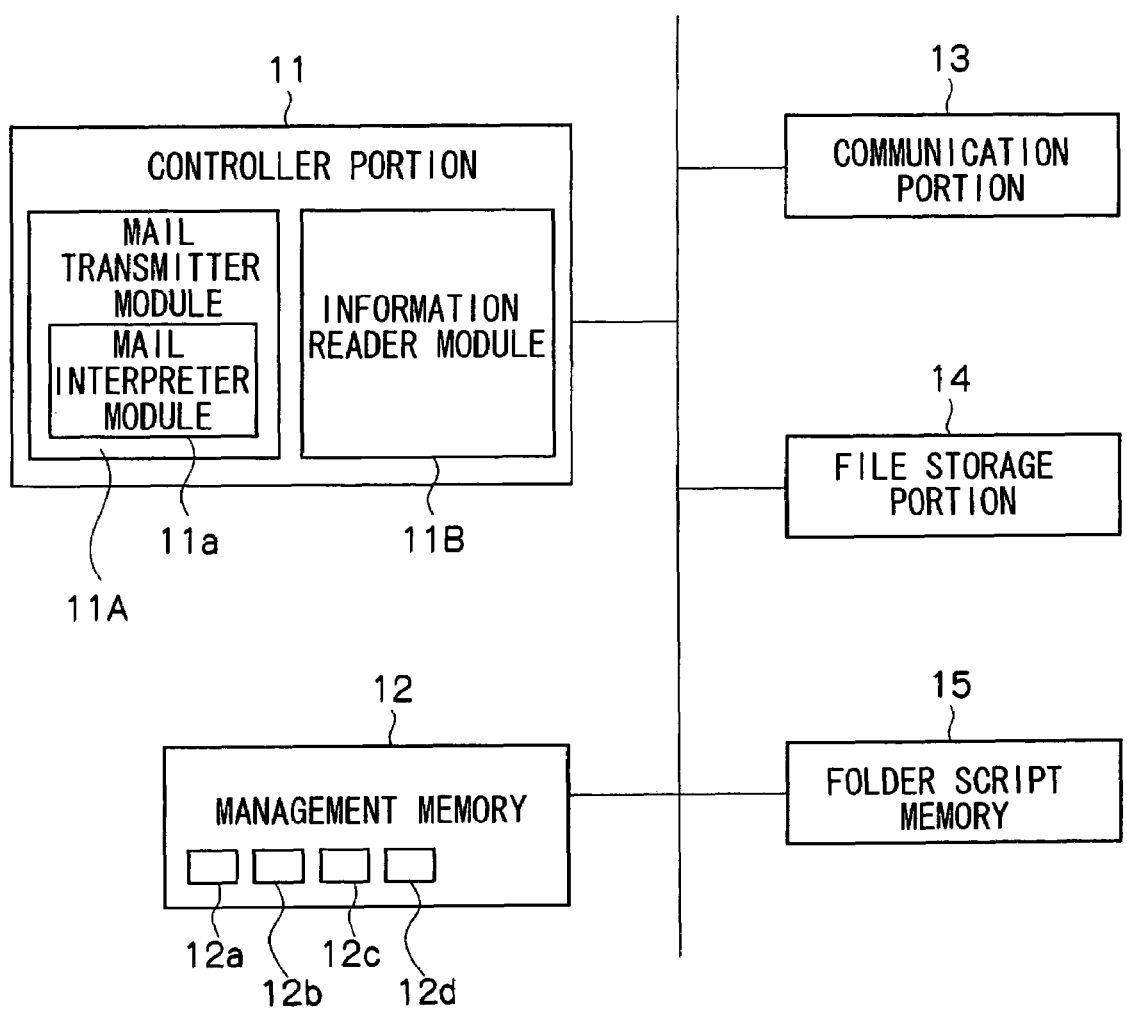
FIG. 2 is a block diagram for showing the structure of a data file storage/management apparatus, according to an embodiment of the present invention.

The data file storage/management apparatus 2 has, as is shown in FIG. 2, a controller portion 11 to control the entire device, a memory 12 for use of management, a communication portion 13 to be connected with the network 7, a file storage portion (i.e., a data storage) 14, a folder script memory 15, etc. Other than those, there may be provided an information input device (for example, a keyboard) for use of inputting the management information or the like, and/or an information output device (for example, a printer).

The controller portion 11 corresponds to a CPU, a ROM and a RAM or the software executed by the CPU, etc., for example, and it executes a predetermined process through analysis of communication information, which is supplied from the communication portion 13, or registers the data files received (being called by only "file", appropriately) into the file storage portion 14, or transmits a necessary file(s), which is/are read from the file storage portion 14, from the communication portion 13.

In case of this embodiment, the controller portion (i.e., the CPU) has a mail transmitter module, as being an executable software module (an embodiment of the electronic mail processing program) 11A and an information reader module 11B.

Within the mail transmitter module 11A, there is included a mail interpreter module 11a. The mail transmitter module 11A makes confirmation whether the electronic mail arriving at the data file storage/management apparatus 2 is interpreted or not, and if the interpretation is needed, the mail transmitter module 11A starts the mail interpreter module 11a. The mail interpreter module 11a interprets that electronic mail (i.e., a main sentence and/or a subject matter), in such a manner as being the programming language, and process the data file(s) attached with the electronic mail or the data file(s) stored within the storage portion 14, in accordance with that description. Herein, the mail interpreter module 11a is so constructed that, when acknowledging the process to be executed according to the interpretation thereof, the mail interpreter module 11a allows the process to be executed, after making confirmation that the user transmitting that electronic mail is a person who is able or authorized to send an instruction of that process. Also, the mail interpreter module 11a is so constructed that, when the electronic mail received includes a content of requesting an answer thereto, the mail interpreter module 11a sends an answer to that effect, when executing the process or when cannot, due to an error or the like, in the form of an electronic mail.

The file processing (i.e., file operation) that can be interpreted by the mail interpreter module 11a is as follows. However, a "file" in this explanation about the file processing means the main sentence of the electronic mail received or a file(s) attached therewith, or a file(s) stored in the file storage portion.

(a) Moving a file into a folder designated, and/or copying;
(b) Sending a file to an address designated;
(c) Format-converting a file(s) into a format(s) designated;
(d) Outputting a file(s) in a designated format after conducting an OCR (i.e., character recognition) process; and
(e) Adding search information to a file(s).

The processing may be described in plural numbers thereof, and further the processing of the same or similar kind (for example, copying) may be described in plural numbers thereof, within one (1) electronic mail, which defines the file processing therein. In case of this embodiment, it is so constructed that, as will be also mentioned later, there can be defined a "folder script" for processing a file coming into the folder, in a definite form. When defining that, "copy a file enclosed within an estimation folder into a cashier folder, necessarily", as being such the folder script, for example, then, any file enclosed within the estimation folder will be necessarily copied into the cashier folder. Even if the process is described within the electronic mail, the process defined within the folder script is also executed, when it is corresponding thereto. For example, the process of copying the file "A" into the estimation folder is instructed within an electronic mail received, and then the file "A" is copied into the cashier folder, too.

The information reading module 11B can read or change information of the corresponding data file storage/management apparatus 2, from a side of the user terminal 3.

The information reader module 11B provides, first of all, a function of allowing the structure of the folder within the file storage portion (i.e., the data storage) 14 to be read out, or also the structure of a folder or a folder name, etc., to be changed. This function is similar to that of the existing data file sharing apparatus, for example.

Second, the information reader module 11B provides a function of allowing the folder script within the folder script memory 15 to be read out, or to be changed, or also to be registered, newly. Application software is already known, for use in definition of the folder script, and therefore, such function can be achieved in the similar manner to the software, in relation to that folder script.

Third, the information reader module 11B has a function of allowing the contents of the file processing, which the data file storage/management apparatus 2 can process, in accordance with an instruction given through the electronic mail received. For example, there is memorized a guidance image data for explaining the contents of file processing, to be provided for such the reading operation, and this guidance image data is transmitted, in response to an operation request from a side of the user terminal 3.

The memory 12 for use of management corresponds to an external memory device, for example, and the memory 12 includes folder-structure data 12a, a file management table 12b, a user management table 12c, and group data 12d, etc.

The folder-structure data 12a describes therein the structures of plural numbers of folders within the file storage portion 14, and the folder-structure data 12a also describes therein, about which file is stored within which folder (i.e., locations of every files in those folders).

The file management table 12b describes therein attributes, such as a data amount, a data format, a file format, a folder name at the lowest hierarchy of storing that file therein, an area location data (i.e., a set of head address and end address) for defining an area storing that file therein, within the file storage portion 14, etc., for example, corresponding to an identification information (i.e., a file name) of each file.

The user management table 12c describes therein a password, an identification number of the user terminal 3 to be used, a usable folder, and the contents of file processing, which can be instructed through a mail, etc., for example, corresponding to the identification information (for example, the name of a user).

The group data 12d describes the apparatuses of the user terminal 3 and the MFP 4, which belong to that group, corresponding to an identification number of the group; therefore, the same user terminal 3 and/or the MFP 4 may be described to be an element (s) of a group different therefrom. For example, the group table 12d may be used to designate a group of the apparatuses, to which a certain file is distributed. However, this group data 12d may be provided within the distribution server 5, which will be mentioned later.

The communication portion 13 corresponds to a communication board and communication software, etc., for example, and it executes the communication between other apparatuses, such as the user terminal 3, the MFP 4, the distribution server 5, the individual database apparatus 6, etc.

The file storage portion (i.e., the data storage) 14 corresponds to a large capacity memory device and an accessing structure thereof, and the file storage portion 14 is used for storing the files therein.

The folder script memory 15 corresponds to a group of semiconductor memories, for example, and stores the registered folder scripts therein.

The user terminal 3 corresponds to an information processing apparatus at a level of a personal computer, having a communication function therein, for example. The user terminal 3 transfers the file(s) and the electronic mail(s) between the data file storage/management apparatus 2, and also reads the information of the data file storage/management apparatus 2, as was mentioned above.

In case of this embodiment, an assistance software 3a for producing an electronic mail, to be used in instruction of file processing, is installed into the user terminal 3, for example.

When being initiated, the assistance software 3a for producing an electronic mail starts up producing of the electronic mail, for which the interpretation is determined necessary, with using the mail transmitter module 11A of the data file storage/management apparatus 2 mentioned above. The assistance software 3a, for production an electronic mail, displays a menu screen for prompting the user to select one from five (5) instructions (a) to (e) mentioned above, which can be instructed with using the electronic mail, and the assistance software 3a determines the parameters or the like, in relation thereto, when selection is made upon anyone, among of those kinds of processes. Herein, in such the structure, it is also possible to select the kinds of process, after determining a condition of application thereof. Also, with the assistance software 3a for production an electronic mail, it is also possible to instruct the kind of process with using the folder script. Further, the assistance software 3a for production an electronic mail has a function of registering a condition of printings (i.e., character size and/or paper sizes, etc.) and/or an address for transmission of the file, etc., by registering it/them with attaching a name(s) thereof to each, in the form of a profile, for example, so as to make it/them usable when producing another electronic mail, later. Furthermore, the assistance software 3a, for production an electronic mail, has also a function of letting an instruction, on whether an answer about a result of processing be requested or not, to be included into the electronic mail. And, also the assistance software 3a for production an electronic mail has further a function of making a confirming, on whether there is a conflict and/or an error in the process or not, which is described within the electronic mail produced, or on what kind of a result will be obtained or expected therefrom, etc.

The main sentence and/or the subject matter of the electronic mail, in which the file process is described, look like as if being arbitrary programs described in a certain language, and the assistance software 3a for production an electronic mail is similar to the assistance software for producing a program for use in a certain program language.

The MFP 4 is provided for the purpose of obtaining a file to be stored into the data file storage/management apparatus 2 through an image scanner function, or for printing out the file stored within the data file storage/management apparatus 2.

The distribution server 5 distributes the file(s) stored within the data file storage/management apparatus 2 to plural numbers of the transmission addresses.

The individual database apparatus 6 indicates a database, which is separated for each of the uses, wherein, for example, an individual file can be added to the data file storage/management apparatus 2. However, the individual database apparatus 6 may be provided in relation to the user terminal 3, or may be achieved as a portion, for processing the individual folders of the data file storage/management apparatus 2.

(A-2) Operation of the Embodiment

A user produces an electronic mail, which describes the file processes therein, to be executed within the data file storage/management apparatus 2, with using the assistance software 3a for production an electronic mail within the user terminal 3, and transmit the mail. However, the user may produce the electronic mail, without using the assistance software 3a.

Figure 3:
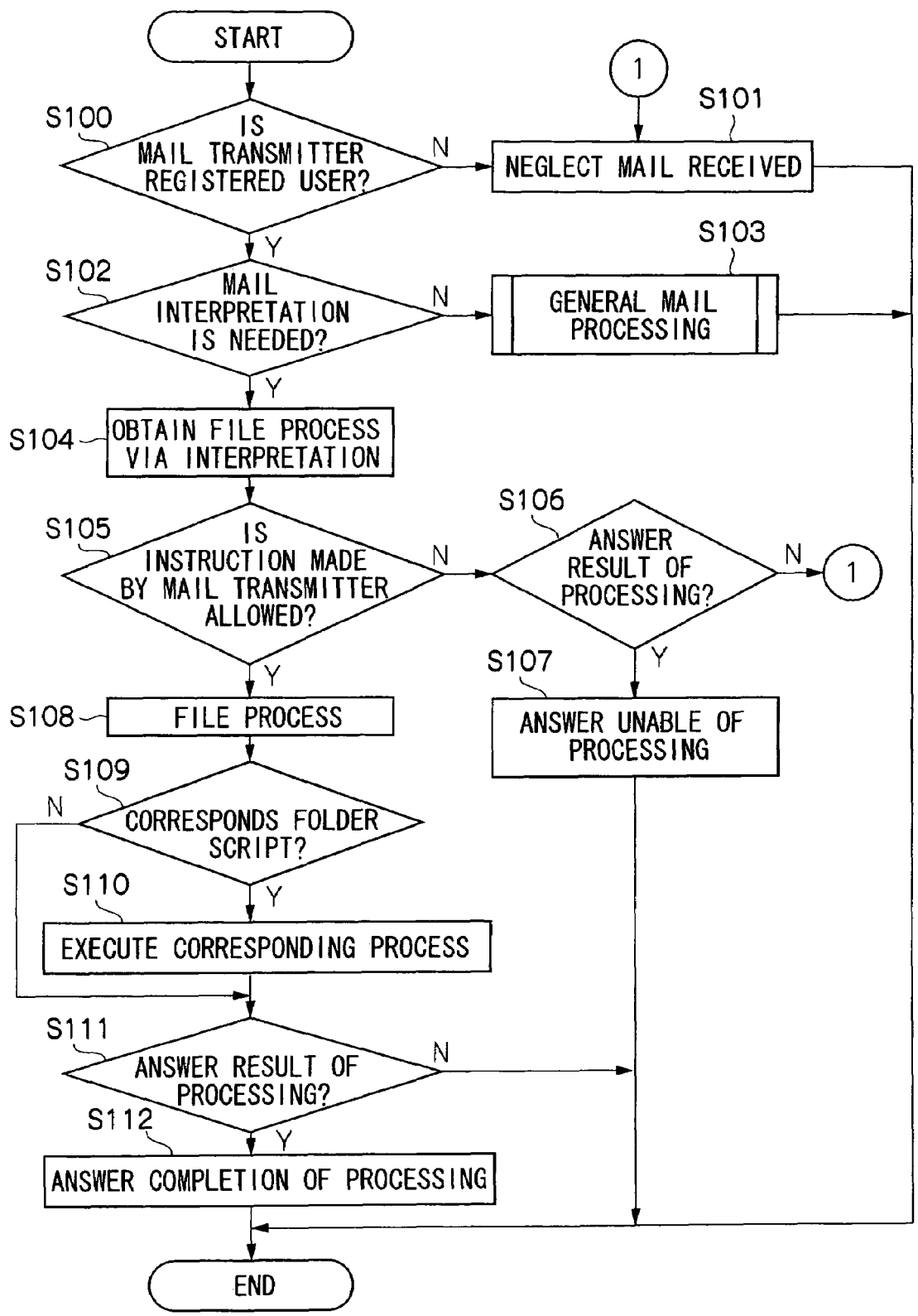
FIG. 3 is a flowchart for showing process when receiving an electronic mail, in the embodiment.

The controller portion 11 of the data file storage/management apparatus 2, at which the electronic mail arrives addressing to itself in transmission thereof, executes the processes shown in FIG. 3. However, the process shown in FIG. 3 is in accordance with the contents of the mail transmitter module 11A, which has the mail interpreter module 11a therein.

The controller portion 11, first of all, determines on whether or not the transmitter (i.e., the user) of the electronic mail is a user registered of the data file sharing system 1 according to the present embodiment, whose name is described in the user management table 12c (S100). If determining not the registered user, the controller portion 11 neglects the electronic mail received (S101). However, even the registered users, it is also possible to allow the data file storage/management apparatus 2 to divide into a person, who is allowed to transmit the electronic mail, and a person not allowed to transmit it.

When determining that the transmitter of the electronic mail is the user registered, then the controller portion 11 further determines on whether the electronic mail received needs the interpretation or not, by means of the mail interpreter module 11a (S102). For example, if there is description "*MI=ON*" in a portion of the subject matter (or, it may be within a head portion of the main sentence, etc.) of the electronic mail, then the controller portion 11 determines that it is the electronic mail in need of the interpretation with an aid of the mail interpreter module 11a, on the other hand if there is not such description therein, it determines the mail does not need the interpretation with an aid of the mail interpreter module 11a. If determining the mail does not need the interpretation, then the controller portion 11 executes the process upon that electronic mail in no need of interpretation, such as a process of only storing the electronic mail, etc., for example (S103).

On the contrary to that, if determining the mail needs the interpretation with an aid of the mail interpreter module 11a, then the controller portion 11 executes the interpretation, so that the controller portion 11 makes acknowledgement on the file process that must be executed (S104). And, the controller portion 11 determines on whether there is included or not the process, on which the transmitter cannot designate or instruct, among those file processes acknowledged, by referring to user management table 12c (S105). For example, the controller portion 11 changes the file process of that kind, which can be designated or instructed, among the five (5) kinds of file processes mentioned above, depending on an authorization level of the user. In case where the data file sharing system of this embodiment is introduced into a certain company, the file processes are made different from each other, i.e., the file processing, which can be instructed by a person in position of a department manager or higher than that, and the file processing, which can be instructed by a person who is in a position lower than that.

If there is included the process, on which the user at the transmitter cannot instruct, then determination is made on whether or not there is description of requesting an answer about the processing result (S106). If there is no such description, the electronic mail received is neglected (S101) On the other hand, if there is such description therein, the controller portion 11 transmits an answer mail indicating that there is an instruction of the file process that cannot be made (S107).

If all of the file processes acknowledged through the interpretation are file processes that can be instructed by the user of the transmitter, after letting the file processes acknowledged to be executed (S108), the controller portion 11 determines on whether there is a process or not, which is defined in the folder script, to be executed in relation to the file processes instructed at this time, while by referring to the contents, which are stored within the folder script memory 15 (S109); i.e., if there is such a process, the controller portion 11 lets that process to be executed (S110).

In case where there is no process to be executed according to the definition of the folder script, or when there is but that process has been completed, then the controller portion 11 determines on whether or not there is description of requesting an answer about the processing result thereof (S111). If there is no such description, the controller portion 11 ends up a series of the processes. On the other hand, if there is such description of requesting an answer about the processing result within the electronic mail received, then the controller portion 11 transmits an answer of electronic mail informing that the process is completed, and ends up the series of the processes (S112). However, if the execution of the file process within the step S108 is ended up under the condition of an error, then information of that effect is included within the answer of electronic mail at that instance.

FIG. 4 shows an example of the electronic mail including an instruction of the file process (i.e., portions of description about the subject matter, the main sentence, and the name(s) of attachment file(s)).

The description "*MI=ON*" included in the subject matter of the electronic mail defines the necessity of the interpretation of the electronic mail. The latter half of the subject matter description "2003 sales data" is an actual subject matter.

On a first line (L1) of the main sentence, there is an instruction of copying an attachment file "file1.xls" into a filer of "sales". The line starting from a string of characters (i.e., a text line), "copy" is prepared for the purpose of instructing a copying process, and the line includes a file name to be copied and information about a destination of that copying, for example. On a second line (L2) of the main sentence, there is an instruction of conducting the OCR (i.e., the character recognition) process upon the file "file2.jpg" and filing a result thereof into a file "file2.pdf". The line starting from a string of characters (i.e., a text line) "ocr" is prepared for the purpose of instructing a character recognition process, and the line includes a file name to be recognized in the characters thereof and a file name of the result of that character recognition. Although explanation will be omitted about the sentence structure thereof, the expressions defined in advance are also applied on other lines. Lines from a third line (L3) to a sixth line (L6) of the main sentence indicate that, the file2.pdf should be copied into a "marketing" folder if there is included a string of characters, such as "Marketing" within "file2.pdf", on the other hand, it should be copied into the "sales" folder if a string of characters of "Marketing" is not included therein. A seventh line (L7) of the main sentence is indicative of transmission of an attachment file "file1.xls" to a destination that is defined in "dest profile1". An eight line (L8) of the main sentence is indicative of printing of the attachment file "file1.xls" through "printer1 (corresponding to the MFP, etc.)", upon basis of the setup that is defined by "print profile1".

(A-3) Effect(s) of the Embodiment

According to the embodiment mentioned above, since the data file storage/management apparatus has an interpretation means of the file designation or instruction within the electronic mail, which is described in a manner of program, various kinds of file processing can be designated or instructed to the data file storage/management apparatus with an aid of the electronic mail. Herein, since the file designation or instruction can be described in the programming manner, it is also possible to execute the file processing, differently, depending upon success or failure when establishing a condition, with using a conditional senesce therein (i.e., an error treating process, such as an escaping when failing, for example).

Also, within the electronic mail to be prepared for the file processing, since there can be included a string of characters instructing that it needs the interpretation thereof, then the data file storage/management apparatus can make determination upon the electronic mail, on whether it needs the interpretation or not, easily.

Further, when the electronic mail arrives at, designating or instructing the file process in need of the interpretation thereof, the data file storage/management apparatus executes the file processing, after confirming that the transmitter thereof is a user or not, who is registered, or that it is the file process or not, which is allowed to that user; therefore, this achieves high security function, in particular, with respect to the files being shared commonly.

Further, since various kinds of information of the data file storage/management apparatus can be read from the user terminal, it is possible to confirm the information necessary for producing an electronic mail, which designates or instructs the file processing therein, appropriately.

Moreover, since the user can also instruct the transmission of an answering electronic mail indicative of completion of the file processing, the user can make a confirmation on whether the file processing designated or instructed is actually executed, or not.

(B) Other Embodiment

In the embodiment mentioned above, there is disclosed an example showing, basically, five (5) kinds of file processing, which can be instructed by means of the electronic mail; however, of course, the present invention should not be restricted only to that. For example, it is also possible to make the processing executable, in relation to registration and/or changes of the folder script (this is also the file processing, in a broad sense), through designation or instruction within the electronic mail.

In the embodiment mentioned above, there is disclosed an example, wherein the main sentence of the electronic mail includes the description therein, being indicative of the designation or instruction of the file processing, as a whole thereof; however, such the description may be indicated in a portion of a starting tag and/or an ending tag, while an arbitrary description is included within the other portions.

The necessity or not of the answer of electronic mail, on whether the file processing designated or instructed is actually executed or not, may be included within the program-like description, or otherwise, a setting in a flag-like manner, such as "*MI=ON*", for example, may be included within a portion of the subject matter, indicative of necessity of the interpretation thereof.

However, the transmitter of the electronic mail should not be limited only to the user terminal, but it may be a terminal of a system manager, for example.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A data file storage and management apparatus, comprising:
    file storage means for storing at least one data file therein;
    mail interpreting means for interpreting a received electronic mail comprising a process of the data file,
        wherein the process is described within a portion of at least one of a subject matter and a main sentence of the received electronic mail, and wherein the process is described as a program comprising instructions for processing the data file;
    file processing startup means for starting up the process of the data file described in the received electronic mail;
    mail transmitting means for sending an answer electronic mail indicative of the results of the process of the data file; and
    information reading means for allowing the structure of folders within the file storage means to be read out or changed from a user terminal,
    wherein the mail transmitting means sends the answer electronic mail only when the mail interpreting means determines that the received electronic mail contains a request for an answer.

2. The data files storage and management apparatus, as described in claim 1, further comprising interpretation possibility determining means for determining whether said mail interpreting means is started or not, upon basis of electronic mail received.

3. The data file storage and management apparatus, as described in claim 2, wherein said interpretation possibility determining means starts up said mail interpreting means under condition that a text line predetermined exists within the electronic mail received.

4. The data file storage and management apparatus, as described in claim 2, wherein said interpretation possibility determining means starts up said mail interpreting means under condition that transmitter of the electronic mail received is a predetermined transmitter, capable of instructing the process of the data file.

5. The data file storage and management apparatus, as described in claim 1, wherein the answer electronic e-mail indicates at least one of the instructed file process cannot be performed, the instructed file processed ended with an error condition, and the instructed file process was completed.

6. The data file storage and management apparatus, as described in claim 1, wherein the received electronic mail is received from the user terminal which performs an assistance program to assist in producing the electronic mail.

7. The data file storage and management apparatus, as described in claim 6, wherein the assistance program determines whether or not the electronic mail contains an error and confirms a result to be obtained from the process described in the electronic mail.

8. A data file storage and management apparatus, comprising:
    a file storage portion for storing at least one data file;
    a communication portion for receiving and sending electronic mail; and
    a controller portion coupled to the storage portion and the communication portion, the controller portion executing an electronic mail processing program including:
        a mail interpreting routine, for interpreting a received electronic mail comprising a process of the data file, wherein the process is described within a portion of at least one of a subject matter and a main sentence of the received electronic mail and wherein the process is described as a program comprising instructions for processing the data file;
        a file processing startup routine for starting up the process of the data file described in the received electronic mail;
        a mail transmitting routine for sending an answer electronic mail indicative of the results of the process of the data file; and
        an information reading module for allowing the structure of folders within the file storage means to be read out or changed from a user terminal,
        wherein the mail transmitting routine sends the answer electronic mail only when the mail interpreting routine determines that the received electronic mail contains a request for an answer.

9. The data file storage and management apparatus, as described in claim 8, wherein the received electronic mail is received from the user terminal which performs an assistance program to assist in producing the electronic mail.

10. The data file storage and management apparatus, as described in claim 9, wherein the assistance program determines whether or not the electronic mail contains an error and confirms a result to be obtained from the process described in the electronic mail.

11. A method for processing electronic mail, the method performed by a data file storage and management apparatus having file storage means, the data file storage and management apparatus storing and managing at least one data file therein, the method comprising:
    interpreting a received electronic mail comprising a process of the data file, the process described within a portion of at least one of a subject matter and a main sentence of the received electronic mail and wherein the process is described as a program comprising instructions for processing the data file;
    starting up the process of the data file described in the received electronic mail;
    when the interpreting determines that the received electronic mail contains a request for an answer, sending an answer electronic mail indicative of the results of the process of the data file;
    reading the structure of folders within the file storage means from a user terminal; and
    changing structure of folders within the file storage means from the user terminal.

12. The method for processing electronic mail, as described in claim 11, wherein the received electronic mail is received from the user terminal, the user terminal performing an assistance program to assist in producing the electronic mail.

13. The method for processing electronic mail, as described in claim 12, further comprising the user terminal determining whether or not the electronic mail contains an error and confirming a result to be obtained from the process described in the electronic mail.

* * * * *